(12) United States Patent
Duraisamy et al.

(10) Patent No.: US 8,806,043 B1
(45) Date of Patent: Aug. 12, 2014

(54) SERVER SELECTION DURING RETRANSMIT OF A REQUEST

(75) Inventors: Sureshkannan Duraisamy, Sunnyvale, CA (US); Dhiraj D. Ballal, Santa Clara, CA (US); Apurva Mehta, Cupertino, CA (US); Santosh Gupta, Fremont, CA (US); Kumar Mehta, Cupertino, CA (US); Venkatesh Gota, San Jose, CA (US); Bill Hong, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 316 days.

(21) Appl. No.: 13/168,613

(22) Filed: Jun. 24, 2011

(51) Int. Cl.
*G06F 15/16* (2006.01)
*G06F 15/173* (2006.01)

(52) U.S. Cl.
USPC ........... 709/229; 709/217; 709/219; 709/223; 709/224; 709/225; 709/226; 709/227; 709/228

(58) Field of Classification Search
CPC ..... H04L 67/10; H04L 67/1008; H04L 63/08; H04L 63/0892
USPC ......... 709/229, 217, 219, 223, 224, 225, 226, 709/227, 228
See application file for complete search history.

(56) References Cited

U.S. PATENT DOCUMENTS

| | | | |
|---|---|---|---|
| 7,610,388 B2 * | 10/2009 | Yamamoto | 709/227 |
| 8,447,757 B1 * | 5/2013 | Cox | 707/720 |
| 2003/0200277 A1 | 10/2003 | Kim | 709/217 |
| 2004/0107364 A1 * | 6/2004 | Shin | 713/201 |
| 2006/0112174 A1 * | 5/2006 | L'Heureux et al. | 709/223 |
| 2007/0041327 A1 * | 2/2007 | Foster et al. | 370/242 |
| 2008/0172679 A1 * | 7/2008 | Shen et al. | 719/318 |
| 2008/0195719 A1 * | 8/2008 | Wu et al. | 709/213 |
| 2009/0138619 A1 * | 5/2009 | Schnizlein et al. | 709/245 |
| 2009/0157757 A1 * | 6/2009 | Yamamoto et al. | 707/200 |
| 2010/0332626 A1 * | 12/2010 | Jonsson et al. | 709/220 |
| 2011/0107358 A1 * | 5/2011 | Shyam et al. | 719/330 |

* cited by examiner

*Primary Examiner* — Rupal Dharia
*Assistant Examiner* — Mohammed Ahmed
(74) *Attorney, Agent, or Firm* — Harrity & Harrity, LLP

(57) ABSTRACT

A method, performed by a network device, may include sending a request to a first server, detecting a first timeout without receiving a response from the first server, and sending the request to the first server and to a second server, in response to detecting the first timeout without receiving a response from the first server.

20 Claims, 7 Drawing Sheets

601 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | X | X | | | |
| 4 | | X | X | | |
| 5 | | | X | X | |
| 6 | | | X | X | |
| 7 | | | | X | X |
| 8 | | | | | X |

602 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | | X | X | | |
| 4 | | | X | X | |
| 5 | | | | X | X |
| 6 | | | | | X |
| 7 | | | | | |
| 8 | | | | | |

603 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | X | X | X | | |
| 4 | X | X | X | | |
| 5 | | X | X | X | |
| 6 | | | X | X | X |
| 7 | | | | X | X |
| 8 | | | | X | X |

604 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | X | X | | | |
| 4 | X | X | | | |
| 5 | | | X | | |
| 6 | | | X | X | |
| 7 | | | X | X | |
| 8 | | | X | X | |

605 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | X | X | X | | |
| 4 | X | X | X | X | |
| 5 | X | X | X | X | X |
| 6 | X | X | X | X | X |
| 7 | X | X | X | X | X |
| 8 | X | X | X | X | X |

606 SERVER PRIORITY NUMBER

| ATTEMPT NUMBER | 1 | 2 | 3 | 4 | 5 |
|---|---|---|---|---|---|
| 1 | X | | | | |
| 2 | X | X | | | |
| 3 | X | X | X | | |
| 4 | X | X | X | X | |
| 5 | | X | X | X | X |
| 6 | | | X | X | X |
| 7 | | | | X | X |
| 8 | | | | | |

SERVER SELECTION DURING RETRANSMIT OF A REQUEST

BACKGROUND

Communication networks typically include network elements, which transfer or switch data from one or more sources to one or more destinations. For example, the network element may receive a data unit from a source device (or another network element), may determine a destination for the data unit, and may send an original or a modified data unit to a destination device (or another network element). A network element may send a request to a server device. For example, the network element may act as a gateway and may send an authorization request to an authorization server device. If the network element does not receive a response within a timeout period, the network element may need to retransmit the request to the server device. However, if the server device went down or if a connection to the server device has been lost, the server device may be unreachable. Retransmitting requests to an unreachable server device may result in long delays.

SUMMARY OF THE INVENTION

According to one aspect, a method performed by a network device, may include sending, by the network device, a request to a first server; detecting, by the network device, a first timeout without receiving a response from the first server; and sending, by the network device, the request to the first server and to a second server, in response to detecting the first timeout without receiving a response from the first server.

According to another aspect, a network device may include a memory to store instructions; and a processor to execute the instructions in the memory to: send a request to a first server; detect a first timeout without receiving a response from the first server; and send the request to the first server and to a second server, in response to detecting the first timeout without receiving a response from the first server.

According to yet another aspect, a non-transitory computer-readable medium, storing instructions executable by one or more processors, may include one or more instructions to send a request to a first server; one or more instructions to detect a first timeout without receiving a response from the first server; and one or more instructions to send the request to the first server and to a second server, in response to detecting the first timeout without receiving a response from the first server.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements.

A client device may be associated with a group of servers to contact in a prioritized order. One approach taken by the client device may be to send a request to a primary server, wait until a timeout is detected, and then retransmit the request to the primary server. Once a particular number of retries has been exhausted with no response from the primary server, the client device may proceed to send the request to a secondary server. If a number of retries are exhausted with no response from the secondary server, the request may be sent to a third server. This approach may result in long delays if the primary server is down or is slow in responding.

Another approach taken by the client device may be to broadcast the request to a group of servers at the same time. However, the client device may not be in a routable domain. Furthermore, broadcasting the request, or sending a unicast request to a group of servers may result in an unnecessary load on the servers and the network.

An implementation described herein may relate to server selection during a retransmit of a request. In one example, a client device may send a request to a primary server. After a first timeout, the request may be re-sent to the primary server and, at the same time, the request may be sent to a secondary server. Subsequent requests may be sent to both the primary server and the secondary server until a number of timeouts are exhausted or until a response is received from at least one of the servers. If a response is received from at least one of the servers, any subsequent responses may be ignored. Furthermore, a release message may be sent to any other servers that have been contacted. The release message may inform the other servers to release any resources that have been allocated in response to receiving a request from the client device.

In another example, subsequent requests, after a second request is sent to both the primary server and the secondary server, may be sent to one or more servers, of a group of servers based on a table. The table may specify which particular servers are to be contacted at each attempt until a response is received from one of the servers.

In one example, the servers or server devices may correspond to authentication, authorization, and accounting (AAA) servers, such as Remote Authentication Dial-In User Service (RADIUS) servers, and the client device may correspond to any network element that requests authentication, authorization, or accounting from one of the AAA servers. If authentication is followed by authorization, authentication and authorization may need to be performed by the same RADIUS server. Thus, if an authentication response is received from a particular RADIUS server, an authorization request may need to be sent to the particular RADIUS server as well.

In another example, the server devices may correspond to Dynamic Host Configuration Protocol (DHCP) servers configured to assign an Internet Protocol (IP) address to a device on behalf of the client device, and the client device may correspond to a gateway device, such as a Packet Data Network Gateway (PGW) of an Evolved Packet Core (EPC) network.

Figure 1:
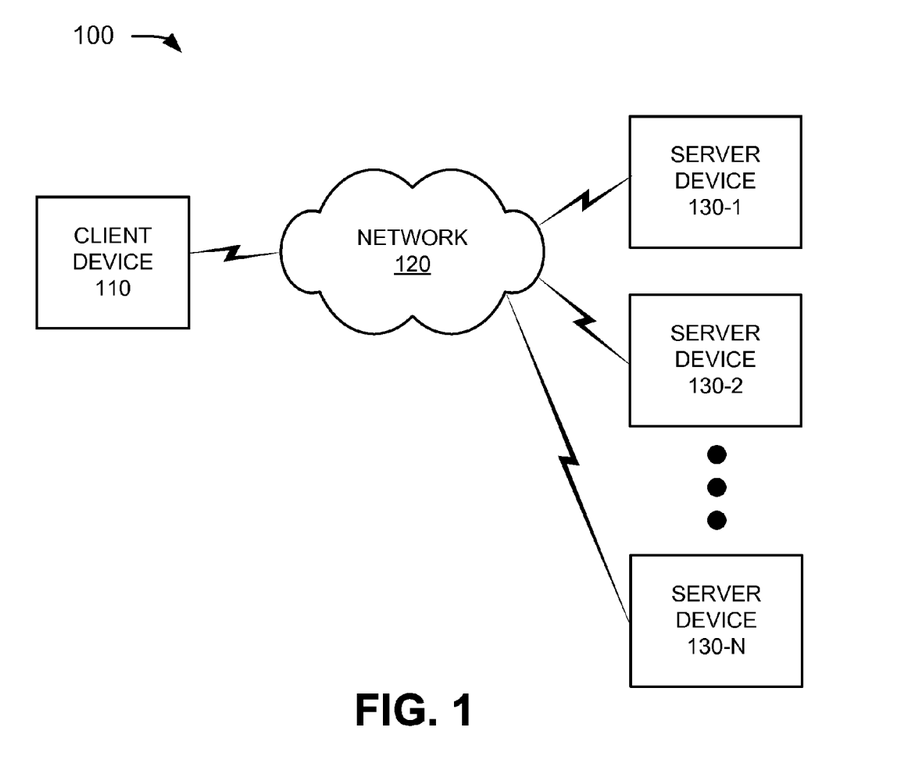
FIG. 1 is a diagram illustrating an example environment according to an implementation described herein.

FIG. 1 is a diagram illustrating an example environment 100 according to an implementation described herein. As shown in FIG. 1, environment 100 may include a client device 110, a network 120, and server devices 130-1 to 130-N (referred to herein collectively as "server devices 130" and individually as "server device 130").

Client device 110 may include one or more devices that send requests to server devices 130. For example, client device 110 may send a particular request to server device 130-1 on a first attempt, may not receive a response from server device 130-1 before a timeout is reached, and may send the particular request to server device 130-1 and server device 130-2 on a second attempt. As another example, client device 110 may send a particular request to server device 130-1 on a first attempt, may not receive a response from server device 130-1 before a timeout is reached, and may send each subsequent request to a particular set of server devices 130-1 to 130-N.

Client device 110 may include any device with a communication function, such as a server device, a mainframe computer, a personal computer or workstation, a portable computer, a portable communication device (e.g. a mobile phone, a smart phone, a tablet computer, a global positioning system (GPS) device, and/or another type of wireless device), a gateway, a router, a switch, a firewall, a network interface card (NIC), a hub, a bridge, a proxy server, an optical add-drop multiplexer (OADM), and/or any type of device capable of communicating with server devices 130. In one example, client device 110 may include a packet data network gateway (PGW) of a Long Term Evolution (LTE) access network. In another example, client device 110 may include another type of gateway, such as a General Packet Radio Service (GPRS) node of a Global System for Mobile Communication (GSM) network; a home agent device of a code division multiple access (CDMA) network; a virtual local area network (VLAN) gateway; and/or any other gateway that interfaces another network to network 120. In yet another example, client device 110 may correspond to a different type of device.

Network 120 may include one or more of a same type of packet-switched networks, one or more packet-switched networks of different types, and/or one or more circuit-switched networks. A "packet" may refer to a packet, a datagram, or a cell; a fragment of a packet, a fragment of a datagram, or a fragment of a cell; or another type, arrangement, or packaging of data. For example, network 120 may include one or more of a local area network (LAN), a wide area network (WAN), a metropolitan area network (MAN), an optical network, a cable television network, a satellite television network, a wireless network (e.g., a CDMA network, a GPRS network, and/or an LTE network), an ad hoc network, a telephone network (e.g., the Public Switched Telephone Network (PSTN) or a cellular network), an intranet, the Internet, or a combination of these networks or other types of networks.

Server device 130 may include one or more devices that respond to a request from client device 110. Server device 130 may include any device with a communication function, such as a server device, a mainframe computer, a personal computer, and/or a workstation. In one example, server device 130 may include a DHCP server that provides an IP address to client device 110 based on a request for an IP address received from client device 110. In another example, server device 130 may include a RADIUS server that provides an authentication, authorization, and/or accounting service for client device 110. In yet another example, server device 130 may include another type of device.

Although FIG. 1 shows example components of environment 100, in other implementations, environment 100 may include fewer components, different components, differently arranged components, and/or additional components than depicted in FIG. 1. Additionally or alternatively, one or more components of environment 100 may perform one or more tasks described as being performed by one or more other components of system 100.

Figure 2:
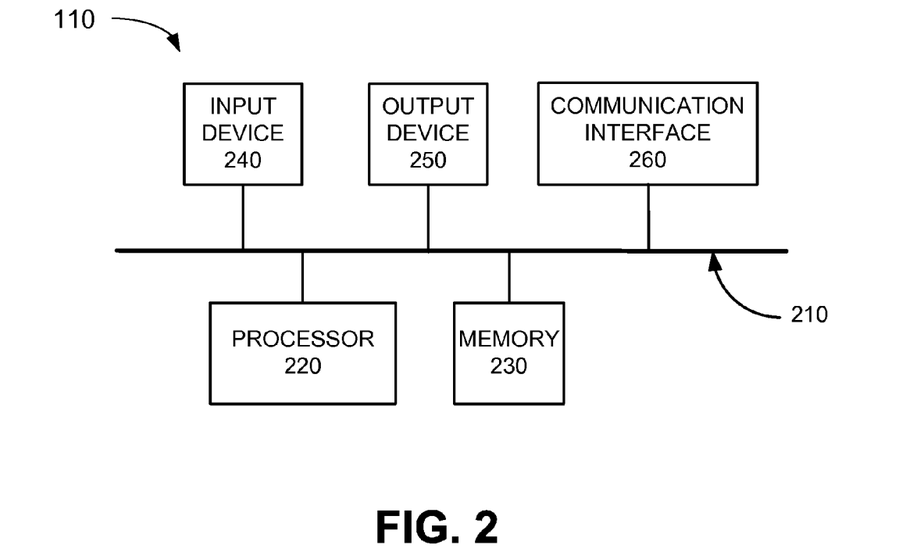
FIG. 2 is a diagram illustrating example components of a client device of the environment of FIG. 1.

FIG. 2 is a diagram illustrating example components of client device 110. As shown in FIG. 2, client device 110 may include a bus 210, a processor 220, a memory 230, and a communication interface 240.

Bus 210 may include a path that permits communication among the components of client device 110. Processor 220 may include one or more processors, microprocessors, or processing logic (e.g., application specific integrated circuits (ASICs) or field programmable gate arrays (FPGAs)) that may interpret and execute instructions. Memory 230 may include a random access memory (RAM) device or another type of dynamic storage device that may store information and instructions for execution by processor 220, a read only memory (ROM) device or another type of static storage device that may store static information and instructions for use by processor 220, a magnetic and/or optical recording memory device and its corresponding drive, and/or a removable form of memory, such as a flash memory.

Communication interface 240 may include any transceiver-like mechanism that enables client device 110 to communicate with other devices and/or systems. For example, communication interface 240 may include a modem, a network interface card, and/or a wireless interface card.

As will be described in detail below, client device 110 may perform certain operations. Client device 110 may perform these operations in response to processor 220 executing software instructions contained in a computer-readable medium, such as memory 230. A computer-readable medium may be defined as a non-transitory memory device. A memory device may include memory space within a single physical memory device or spread across multiple physical memory devices.

The software instructions may be read into memory 230 from another computer-readable medium, or from another device via communication interface 240. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of client device 110, in other implementations, client device 110 may contain fewer components, different components, additional components, or differently arranged components than depicted in FIG. 2. Additionally or alternatively, one or more components of client device 110 may perform one or more tasks described as being performed by one or more other components of client device 110.

Figure 3:
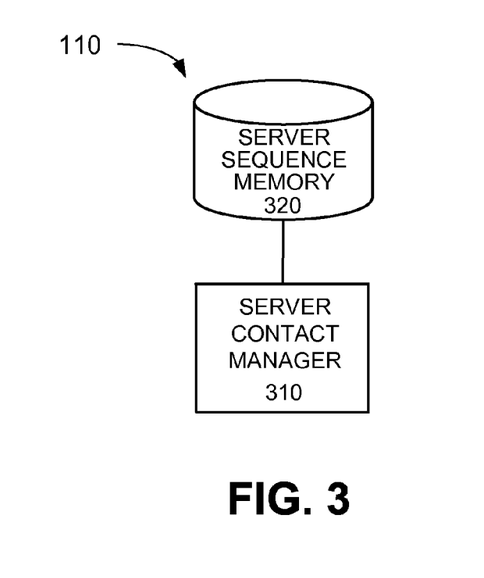
FIG. 3 is a diagram illustrating example functional components of the client device.

FIG. 3 is a diagram illustrating example functional components of client device 110. As shown in FIG. 3, client device 110 may include a server contact manager 310 and a server sequence memory 320.

Server contact manager 310 may determine to contact a particular server device 130 and may contact server devices 130 in a sequence specified by server sequence memory 320. For example, server contact manager 310 may contact a primary server of server devices 130, may detect a timeout without receiving a response from the primary server, and may contact the primary server and a secondary server at the same time during a second attempt. Server contact manager 310 may contact particular servers during subsequent attempts as specified by server sequence memory 320. If a response is received from a particular server device, server contact manager 310 may act on the response and may not act on a subsequent response received from another server device 130. In one example, server contact manager 310 may inform other servers to which the request has been sent, that a response has already been received from one of the servers and that the other servers need not respond.

Server sequence memory 320 may store information identifying a sequence in which server devices 130 are to be contacted. For example, server sequence memory 320 may store information identifying a primary server that is to be contacted, a secondary server that is to be contacted, etc. Additionally or alternatively, server sequence memory 320 may include a table that specifies particular servers that are to be contacted on each attempt. Example tables that may be stored in server sequence memory 320 are described below with reference to FIG. 6.

Although FIG. 3 shows example functional components of client device 110, in other implementations, client device 110 may include fewer functional components, different functional components, differently arranged functional components, and/or additional functional components than depicted in FIG. 3. Additionally or alternatively, one or more functional components of client device 110 shown in FIG. 3 may perform one or more tasks described as being performed by one or more other functional components of client device 110 shown in FIG. 3.

Figure 4:
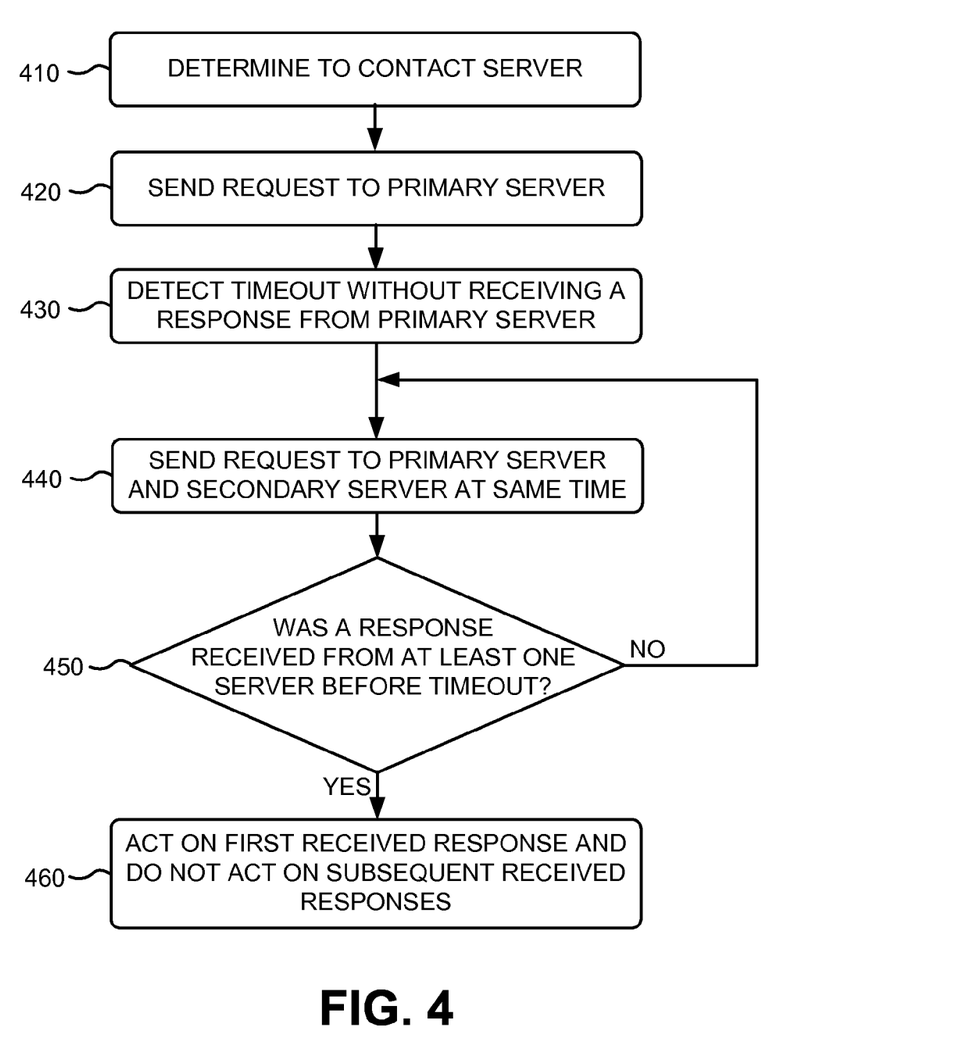
FIG. 4 is a diagram of a flow chart illustrating a first example process for selecting a server during a retransmit of a request according to an implementation described herein.

FIG. 4 is a diagram of a flow chart illustrating a first example process for selecting a server during a retransmit of a request according to an implementation described herein. In one implementation, the process of FIG. 4 may be performed by client device 110. In other implementations, some or all of the process of FIG. 4 may be performed by another device or a group of devices separate and/or possibly remote from or including client device 110.

The process of FIG. 4 may include determining to contact a server (block 410). Server contact manager 310 may determine that server device 130 needs to be contacted. For example, if server device 130 corresponds to an AAA server, server contact manager 310 may determine that the AAA server is to be contacted for authentication, authorization, or accounting. As another example, if server device 130 corresponds to a DHCP server, server contact manager 310 may determine that an IP address needs to be obtained from the DCHP server.

A request may be sent to a primary server (block 420). For example, during a first attempt, server contact manager 310 may send the request to server device 130-1, based on server device 130-1 being identified as the primary server in server sequence memory 320.

A timeout may be detected without receiving a response from the primary server (block 430). For example, server contact manager 310 may determine that an amount of time corresponding to a timeout interval has elapsed without a response being received from the primary server.

The request may be resent to the primary server and sent to a secondary server at the same time (block 440). For example, during a second attempt, server contact manager 310 may send the request to server device 130-1 and to server device 130-2, at substantially the same time, based on server device 130-2 being identified as the secondary server in server sequence memory 320.

A determination may be made as to whether a response has been received from at least one server before a timeout (block 450). For example, server contact manager 310 may determine whether a response was received from either server device 130-1 or server device 130-2 before an amount of time corresponding to the timeout interval has elapsed.

If it is determined that no response was received from at least one server before a timeout (block 450—NO), the process may return to block 440, to send another request to the primary server and to a secondary server at the same time. If it is determined that a response was received from at least one server before the timeout (block 450—YES), the first received response may be acted on and any subsequent response, received from another server, may not be acted on (block 460). For example, if server devices 130 correspond to AAA servers, and client device 110 receives an authentication response from server device 130-2, client device 110 may accept the authentication response received from server device 130-2 and may ignore a subsequent authentication response received from server device 130-1. As another example, if server devices 130 correspond to DHCP servers, and client device 110 receives a DHCP offer from server device 130-1, client device 110 may accept the DHCP offer from server device 130-1 and may send a DHCP request to server device 130-1, and may ignore a subsequent DHCP offer received from server device 130-2. In one example, client device 110 may inform other servers to which the request has been sent, that a response has already been received from one of the servers and that the other servers need not respond. For example, client device 110 may send a release message to the other servers. The release message may inform the other servers that any resources, allocated in response to receiving a request from client device 110, may be released.

Figure 5:
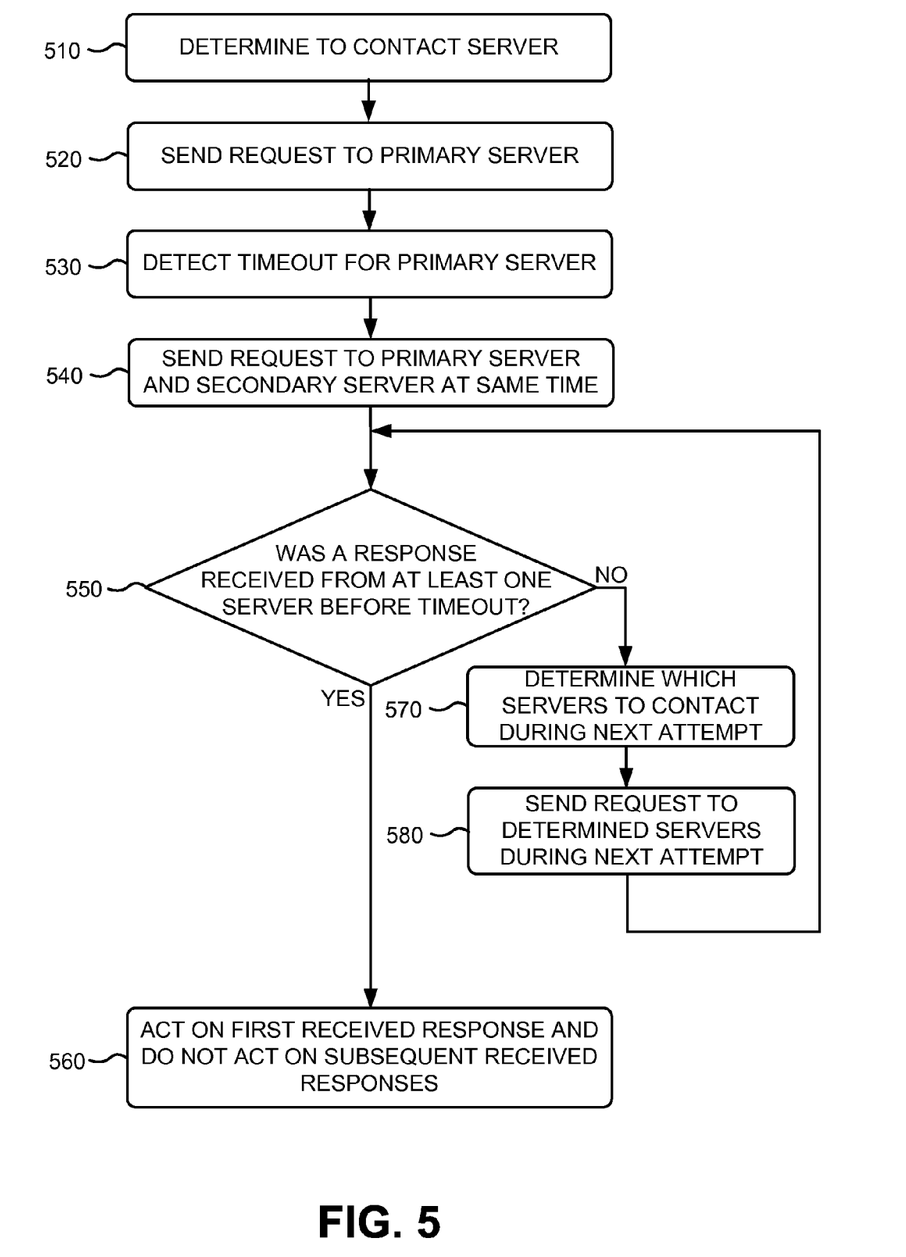
FIG. 5 is a diagram of a flow chart illustrating a second example process for selecting a server during a retransmit of a request according to an implementation described herein.

FIG. 5 is a diagram of a flow chart illustrating a second example process for selecting a server during a retransmit of a request according to an implementation described herein. In one implementation, the process of FIG. 5 may be performed by client device 110. In other implementations, some or all of the process of FIG. 5 may be performed by another device or a group of devices separate and/or possibly remote from or including client device 110.

The process of FIG. 5 may include determining to contact a server (block 510); sending a request to a primary server (block 520); detecting a timeout without receiving a response from the primary server (block 530); and sending a request to the primary server and to a secondary server at the same time (block 540). Blocks 510-540 of FIG. 5 may correspond to blocks 410-440 of FIG. 4. Processing may continue to block 550.

A determination may be made as to whether a response has been received from at least one server before a timeout (block 550). For example, server contact manager 310 may determine whether a response was received from either the primary or the secondary server before an amount of time corresponding to the timeout interval has elapsed.

If it is determined that no response was received from at least one server before a timeout (block 550—NO), a determination may be made as to which servers to contact during a next attempt (block 570). For example, server contact manager 310 may access server sequence memory 320 to determine which sequence of servers to contact. In one example, if the attempt is a third attempt, server sequence memory 320 may specify to again attempt to contact the primary and secondary servers. In another example, if the attempt is a third attempt, server sequence memory 320 may specify to attempt to contact the secondary server and a third server. In yet another example, if the attempt is a third attempt, server sequence memory 320 may specify to contact the primary server, the secondary server, and the third server. Example server contact tables that may be stored in server sequence memory 320 and used by server contact manager 310 are described below with reference to FIG. 6.

A request may be sent to the determined servers during a next attempt (block 580). For example, server contact manager 310 may send a request to the determined servers and processing may return to block 550, to determine whether a response was received from at least one server before a next timeout occurs.

If it is determined that a response was received from at least one server before the timeout (block 550—YES), the first received response may be acted on and any subsequent response, received from another server, may not be acted on (block 560). Block 560 of FIG. 5 may be analogous to block 460 of FIG. 4. Furthermore, similarly to the process of FIG. 4, client device 110 may send a release message to any other servers to which a request has been sent.

Figure 6:
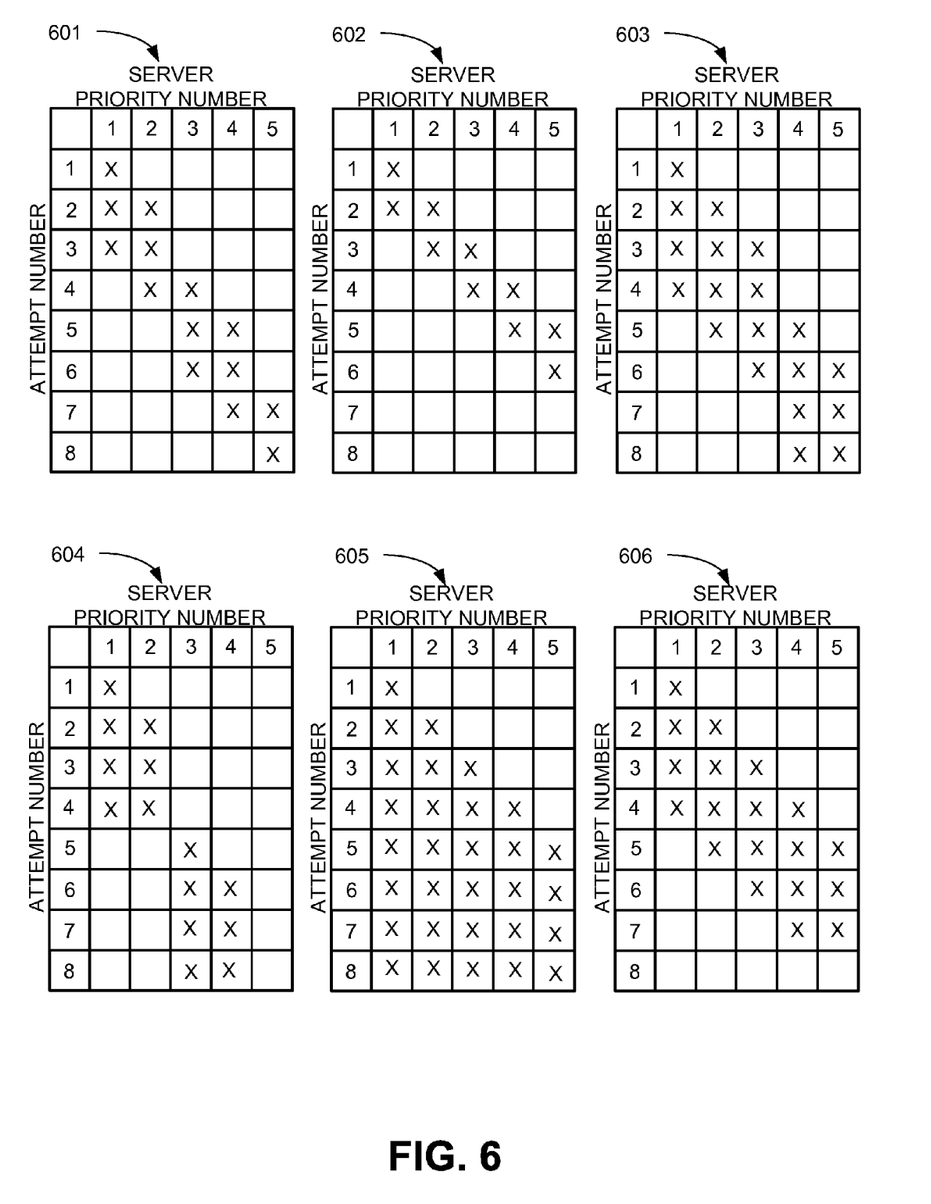
FIG. 6 is a diagram illustrating example tables that may be stored in a server sequence memory according to an implementation described herein.

FIG. 6 is a diagram illustrating example tables 601-606 that may be stored in server sequence memory 320 according to an implementation described herein. As shown in FIG. 6, example table 601 illustrates a server contact sequence in which each server may get three retries and in which, after the first attempt, two servers may be contacted at each attempt. After the second attempt, during which the request is sent to the first server and the second server, a third attempt is made to contact both the first server and the second server. After the third attempt, the three retries for the first server are exhausted, and thus the first server may no longer be contacted. Thus, during a fourth attempt, the second server and a third server may be contacted. After the fourth attempt, the three retries for the second server are exhausted, and the second server may not longer be contacted. Thus, during a fifth attempt, the third server and a fourth server may be contacted.

Example table 602 illustrates a server contact sequence in which each server may get two retries and in which, after the first attempt, two servers may be contacted at each attempt. After the second attempt, during which the request is sent to the first server and the second server, a third attempt is made to the second server and a third server. A fourth attempt may include a request sent to the third server and a fourth server, a fifth attempt may include a request sent to the fourth server and a fifth server, etc.

Example table 603 illustrates a server contact sequence in which each server may get four retries and in which a new server is added at a new retry, up to a maximum of three servers being contacted at a time. After the second attempt, during which the request is sent to the first server and the second server, a third attempt is made during which the request may be sent to the first server, the second server, and a third server. During a fourth attempt, the request is again sent to the first server, the second server, and the third server, and no new server is added, since a maximum of three servers may be contacted at a time. After the fourth attempt, the four retries for the first server may be exhausted, and the first server may no longer be contact. This may further indicate that another server may be added during the fifth attempt, and thus the request may be sent to the second server, the third server, and a fourth server during the fifth attempt.

Example table 604 illustrates a server sequence in which the first and second server are contacted until the number of retries are exhausted for the first and second server, at which point a third server may be contacted. After the second attempt, during which the request is sent to the first server and the second server, third and fourth attempts are made during which the request may be again sent to the first server and the second server. After the fourth attempt, the number of retries for the first server and the second server may be exhausted and a third server may be contacted. After a first attempt to contact the third server (corresponding to the overall fifth attempt), the next attempt may contact the third server and a fourth server. The request may be sent to the third and fourth servers until the number of retries for the third and fourth servers are exhausted.

Example table 605 illustrates a server sequence in which the request is sent to an additional server during each subsequent request and in which a particular maximum number of retries may not be specified. After the second attempt, during which the request is sent to the first server and the second server, a third attempt may include sending a request to the first, second, and third servers, a fourth attempt may include sending a request to the first, second, third, and fourth servers, a fifth attempt may include sending a request to the first, second, third, fourth, and fifth server, etc.

Example table 606 illustrates a server sequence in which the request the request is sent to an additional server during each subsequent request and in which each server may get a maximum of four retries. Thus, in contrast to example table 605, after the fourth attempt, the request is not sent to the first server anymore, after the fifth attempt, the request is not sent to the second server anymore, etc.

Another example table (not shown in FIG. 6) may include a server sequence in which a server request is sent to a first server and a second server during a first attempt. Sending a request to two servers initially during a first attempt may be beneficial, for example, in situations when there are connections with a high level of noise, when a fast response is critical to performance, or when an application is sensitive to a particular quality of service. Yet another example table (not shown in FIG. 6) may include a random selection of servers during each attempt. Random selection of servers may be beneficial, for example, in high security situations.

Although FIG. 6 shows example server sequence tables 601-606 that may be stored in server sequence memory 320, in other implementations, server sequence memory 320 may contain a different server sequence table than one of the tables depicted in FIG. 6, and/or may include a server sequence table with fewer entries, different entries, additional entries, or differently arranged entries than depicted in FIG. 6. For example, while example tables 601-606 indicate that during the second attempt, the request is to be sent to the first server and the second server, in another example, the second attempt may indicate that the request is to be sent to the first server only, or that the request is to be sent to the first server, the second server, and the third server.

Figure 7:
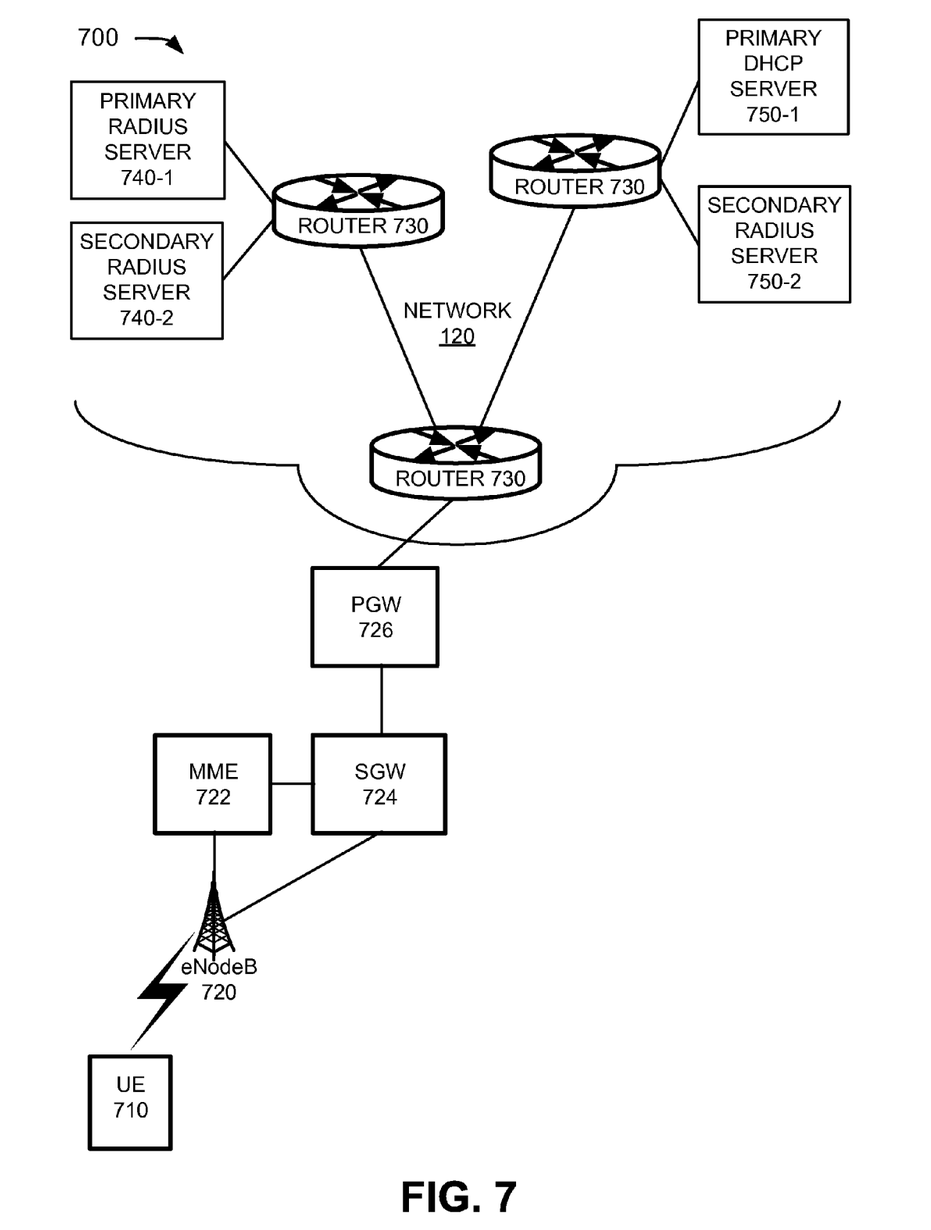
FIG. 7 is a diagram of an example environment according to an implementation described herein.

FIG. 7 is a diagram of an example environment 700 according to an implementation described herein. As shown in FIG. 7, environment 700 may include a user equipment (UE) 710, an eNodeB 720, a Mobility Management Entity (MME) 722, a Serving Gateway (SGW) 724, a Packet Data Network Gateway (PGW) 726, routers 730, a primary RADIUS server 740-1, a secondary RADIUS server 740-2, a primary DHCP server 750-1, and a secondary DHCP server 750-2.

UE 710 may include any communication device that a user may use to connect to network 120. For example, UE 710 may include a mobile communication device, such as a mobile phone, a personal digital assistant (PDA), a GPS receiver or a media playing device with communication capabilities; a desktop device, such as a personal computer or a workstation; a laptop computer; a telephone terminal; or any other communication device or combinations thereof.

eNodeB 720 may include one or more devices (e.g., base stations) and other components and functionality that allow UE 710 to wirelessly connect to network 120. MME device 722 may implement control plane processing for communications between UE 710 and network 120. For example, MME device 722 may implement tracking and paging procedures for UE 710, may activate and deactivate bearers for UE 710, and/or may authenticate a user of UE 710. SGW 724 may provide an access point to and from UE 710, may handle forwarding of data packets for UE 710, and/or may act as a local anchor point during handover procedures between eNodeB 720 and another eNodeB. PGW 726 may function as an IP gateway to network 120.

Routers 730 may include routers that route packets through network 120. For example, routers 730 may route packets between PGW 726 and primary RADIUS server 740-1, secondary RADIUS server 740-2, primary DHCP server 750-1, and/or secondary DHCP server 750-2. Primary RADIUS server 740-1 and secondary RADIUS server 740-2 may perform AAA services for UE 710. For example, primary RADIUS server 740-1 or secondary RADIUS server 740-2 may authenticate UE 710 to access network 120 or may authorize UE 710 for particular services. Primary DHCP server 750-1 and secondary DHCP server 750-2 may receive a request for an IP address for UE 710 from PGW 726 and may send a DHCP offer to PGW 726 with an IP address selected from a pool of available IP addresses.

Although FIG. 7 shows example components of environment 700, in other implementations, environment 700 may contain fewer components, different components, additional components, or differently arranged components than depicted in FIG. 7. Additionally or alternatively, one or more components of environment 700 may perform one or more tasks described as being performed by one or more other components of environment 700.

Figure 8:
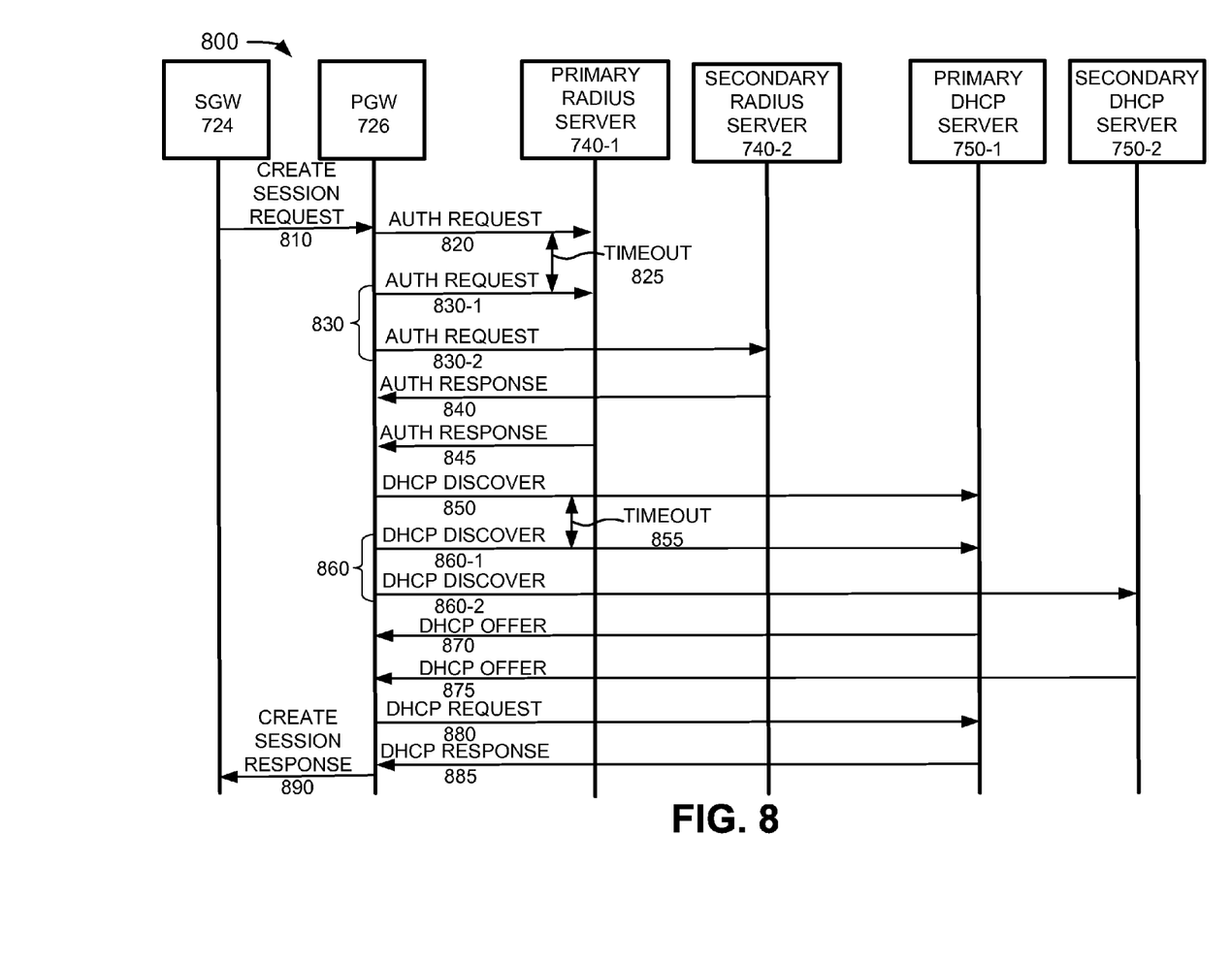
FIG. 8 is a diagram of an example signal flow chart of the environment of FIG. 7.

FIG. 8 is a diagram of an example signal flow chart 800 of the environment of FIG. 7. Example signal flow chart 800 may include SGW 724 sending a request to create a session for UE 710 to PGW 726 (signal 810). PGW 726 may send an authorization request to primary RADIUS server 740-1 (signal 820). PGW 726 may not receive a response from primary RADIUS server 740-1 within a period of time corresponding to a timeout 825. In response to detecting timeout 825, PGW 726 may send a re-transmitted request 830 to both primary RADIUS server 740-1 and secondary RADIUS server 740-2 (signals 830-1 and 830-2).

PGW 726 may receive an authorization response from secondary RADIUS server 740-2 (signal 840). PGW 726 may authorize the session request based on the response received from secondary RADIUS server 740-2. PGW 726 may subsequently receive an authorization response from primary RADIUS server 740-1 (signal 845) and may ignore the authorization response received from primary RADIUS server 740-1, since the session request has already been authorized.

Next, PGW 726 may send a DHCP discover request to primary DHCP server 750-1 (signal 850). PGW 726 may not receive a response from primary DHCP server 750-1 within a period of time corresponding to a timeout 855. In response to detecting timeout 855, PGW 726 may send a re-transmitted DHCP discovery request 880 to both primary DHCP server 750-1 and secondary DHCP server 750-2 (signals 860-1 and 860-2).

PGW 726 may receive a DHCP offer from primary DHCP server 750-1 (signal 870). PGW 726 may further receiver receive a DHCP offer from secondary DHCP server 750-2 (signal 875). PGW 726 may accept the first DHCP offer received, which in this case may be the DHCP offer received from primary DHCP server 750-1 and may ignore the DHCP offer received from secondary DHCP server 750-2.

PGW 726 may send a DHCP request for an IP address to primary DHCP server 750-1 (signal 880) and may receive a DHCP response from primary DHCP server 750-1 (signal 885), assigning an IP address for the requested session. In response, PGW 726 may send a create session response to SGW 724, creating the requested session for UE 710 (signal 890).

Although FIG. 8 shows example signals that may be exchanged within environment 700, in other examples, signals that may be exchanged within environment 700 may include fewer signals, different signals, additional signals, or signals exchanged in a different sequence.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 7 and 8, the order of the blocks may be modified in other implementations. Further, non-dependent blocks may be performed in parallel.

Also, certain portions of the implementations may have been described as a "component" or "manager" that performs one or more functions. The "component" and "manager" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:
1. A method comprising:
sending, by a network device and during a first attempt, a request to a first server;
detecting, by the network device, a first timeout without receiving a response, from the first server, to the request sent during the first attempt;

sending, by the network device and during a second attempt, the request to the first server and a second server, based on:
  detecting the first timeout without receiving a response, from the first server, to the request sent during the first attempt, and
  information identifying servers to which the request is to be sent,
    the information identifying the servers including:
      information identifying a plurality of attempts relating to the request, and
      information identifying each server to which the request is to be sent during each attempt of the plurality of attempts,
    the information identifying the servers indicating that, during the second attempt, the request is to be sent to the first server and the second server after the first timeout is detected without receiving a response, from the first server, to the request sent during the first attempt; and
sending, by the network device, a message to one of the first server or the second server when a response is received from another one of the first server or the second server, the message instructing the one of the first server or the second server to not respond to the request.

2. The method of claim 1, further comprising:
receiving the response from the other one of the first server or the second server;
acting on the response received from the other one of the first server or the second server;
receiving a response from the one of the first server or the second server, subsequent to the response received from the other one of the first server or the second server; and
ignoring the response, received from the one of the first server or the second server, based on receiving the response from the other one of the first server or the second server.

3. The method of claim 1, further comprising:
detecting a second timeout without receiving a response from the first server or the second server;
determining, based on the information identifying the servers, one or more servers to which the request is to be sent during a third attempt after detecting the second timeout; and
sending the request to the determined one or more servers during the third attempt.

4. The method of claim 3, where the information identifying the servers is stored in a data structure, and
where determining the one or more servers includes:
  accessing the data structure to determine the one or more servers.

5. The method of claim 1, further comprising:
detecting a second timeout without receiving a response from the first server or the second server; and
resending the request to the first server and to the second server, based on detecting the second timeout without receiving a response from the first server or the second server.

6. The method of claim 1, further comprising:
detecting a second timeout without receiving a response from the first server or the second server; and
sending the request to the first server, the second server, and a third server, based on detecting the second timeout without receiving a response from the first server or the second server.

7. The method of claim 1, further comprising:
detecting, after sending the request during the second attempt, a second timeout without receiving a response from the first server or the second server; and
sending the request to the second server, a third server, and not the first server, based on:
  detecting the second timeout without receiving a response from the first server or the second server, and
  the information identifying the servers.

8. The method of claim 1, where:
the network device includes a gateway for a wireless access network,
each of the first server and the second server includes a Remote Dial-In Authentication User Service (RADIUS) server, and
the request includes a request to authorize a session for a user equipment to access an Internet Protocol (IP) network using the wireless access network.

9. The method of claim 1, where:
the network device includes a gateway for a wireless access network,
each of the first server and the second server includes a Dynamic Host Configuration Protocol (DHCP) server, and
the request includes a DHCP discover request.

10. A network device comprising:
a memory to store instructions; and
a processor to execute the instructions in the memory to:
  send a request to a first server during a first attempt,
  detect a first timeout without receiving a response from the first server,
  identify one or more servers to which the request is to be sent during a second attempt based on:
    detecting the first timeout, and
    information identifying servers to which the request is to be sent,
      the information identifying the servers including:
        information identifying a plurality of attempts, and
        information identifying each server to which the request is to be sent during each attempt of the plurality of attempts,
  send the request to the first server and a second server during a second attempt based on:
    detecting the first timeout without receiving a response from the first server, and
    the information identifying the servers,
    the information identifying the servers indicating that the request is to be sent to the first server and the second server during the second attempt, and
  send a message to one of the first server or the second server when a response is received from another one of the first server or the second server,
    the message instructing the one of the first server or the second server to not respond to the request.

11. The network device of claim 10, where the processor is further to execute the instructions to:
receive the response from the other one of the first server or the second server;
send a message, to the one of the first server or the second server, to release one or more resources that have been allocated based on receiving the response from the other one of the first server or the second server;
act on the response received from the other one of the first server or the second server;

receive a response from the one of the first server or the second server, subsequent to the response received from the other one of the first server or the second server; and ignore the response received from the one of the first server or the second server based on receiving the response from the other one of the first server or the second server.

12. The network device of claim 10, where the processor is further to execute the instructions to:

detect a second timeout without receiving a response from the first server or the second server;

determine, based on the information identifying the servers, at least one server to which the request is to be sent after detecting the second timeout; and send the request to the determined at least one server.

13. The network device of claim 10, where:

the network device includes a gateway for a wireless access network, each of the first server and the second server includes a Remote Dial-In Authentication User Service (RADIUS) server, and the request includes a request to authorize a session for a user equipment to access an Internet Protocol (IP) network using the wireless access network.

14. The network device of claim 10, where:

the network device includes a gateway for a wireless access network, each of the first server and the second server includes a Dynamic Host Configuration Protocol (DHCP) server, and the request includes a DHCP discover request.

15. A non-transitory computer-readable medium storing instructions, the instructions comprising:

one or more instructions which, when executed by a processor, cause the processor to send a request to a first server during a first attempt;

one or more instructions which, when executed by the processor, cause the processor to detect a first timeout without receiving a response, from the first server, to the request sent during the first attempt;

one or more instructions which, when executed by the processor, cause the processor to send the request to the first server and to a second server based on:

detecting the first timeout without receiving a response from the first server, and information identifying servers to which the request is to be sent, the information identifying the servers including:

information identifying a plurality of attempts, and information identifying each server to which the request is to be sent during each attempt of the plurality of attempts, the information identifying the servers indicating that during the second attempt, the request is to be sent to the first server and the second server; and one or more instructions which, when executed by the processor, cause the processor to send a message to one of the first server or the second server when a response is received from another one of the first server or the second server, the message instructing the one of the first server or the second server to not respond to the request.

16. The non-transitory computer-readable medium of claim 15, the instructions further comprising:

one or more instructions to receive the response from the other one of the first server or the second server;

one or more instructions to act on the response received from the other one of the first server or the second server;

one or more instructions to receive a response from the one of the first server or the second server, subsequent to the response received from the other one of the first server or the second server; and one or more instructions to ignore the response, from the one of the first server or the second server, based on receiving the response from the other one of the first server or the second server.

17. The non-transitory computer-readable medium of claim 15, the instructions further comprising:

one or more instructions to detect a second timeout without receiving a response from the first server or the second server;

one or more instructions to determine one or more servers to which the request is to be sent; and one or more instructions to send the request to the determined one or more servers after detecting the second timeout.

18. The non-transitory computer-readable medium of claim 15, the instructions further comprising:

one or more instructions to detect a second timeout without receiving a response from the first server or the second server; and one or more instructions to send the request to the first server and to the second server, based on detecting the second timeout without receiving a response from the first server or the second server.

19. The non-transitory computer-readable medium of claim 15, the instructions further comprising:

one or more instructions to detect a second timeout without receiving a response from the first server or the second server; and one or more instructions to send the request to the first server, the second server, and a third server, based on detecting the second timeout without receiving a response from the first server or from the second server.

20. The non-transitory computer-readable medium of claim 15, the instructions further comprising:

one or more instructions to detect a second timeout without receiving a response from the first server or the second server; and one or more instructions to send the request to the second server and to a third server, based on detecting the second timeout without receiving a response from the first server or from the second server.

* * * * *